Patented Feb. 27, 1923.

1,446,933

UNITED STATES PATENT OFFICE.

VERNON H. SCHNEE, OF ITHACA, NEW YORK.

PROCESS FOR THE MANUFACTURE OF BLACK CARBONACEOUS PIGMENT.

No Drawing.  Application filed January 20, 1922. Serial No. 530,660.

*To all whom it may concern:*

Be it known that I, VERNON H. SCHNEE, a citizen of the United States, residing at Ithaca, in the county of Tompkins and State of New York, have invented a certain new and useful Process for the Manufacture of Black Carbonaceous Pigment, of which the following is a true and exact specification.

My invention relates to a process for the manufacture of black carbonaceous pigment by the decomposition of carbon monoxide gas, and has for its object to produce such a pigment superior in quality to the black carbonaceous pigments now manufactured and used, and incidentally to render the process for making black carbonaceous pigment considerably cheaper and independent of the supply of natural hydrocarbon gases.

As is well known, the black carbonaceous pigment which is known and used commercially under the name of "carbon black" consists essentially of finely divided carbon obtained by the partial combustion of hydrocarbon gases, as, for example, natural gas, in a supply of air insufficient for the complete combustion of the hydrocarbons in the gas. This process for the manufacture of black carbonaceous pigment is known to be inefficient, since only a relatively small proportion of the carbon contained in the hydrocarbons of the original gas is recovered in the black pigment obtained therefrom. Moreover, the supply of hydrocarbon gases, particularly natural gas, available for use in the manufacture of black carbonaceous pigments is steadily decreasing and will be insufficient to meet the commercial demand within a comparatively short time.

I have found that a black carbonaceous pigment consisting essentially of carbon in a finely divided condition, is obtained when carbon monoxide gas is caused to decompose into carbon dioxide gas and carbon at temperatures above 300 degrees centigrade and below 800 degrees centigrade. This product is superior in covering power and in hiding power to the black carbonaceous pigments, as for example, carbon black, which are obtained by the partial combustion of hydrocarbon gases.

I have found that this decomposition of carbon monoxide gas and the resulting formation of black carbonaceous pigment takes place much more readily and much more rapidly when the carbon monoxide is brought in contact with a suitable catalyst. As catalysts for this decomposition, I prefer to use a metal of the eighth group of the periodic table, as, for example, cobalt metal. Moreover, I have found that the decomposition of the carbon monoxide gas and the formation of the black carbonaceous pigment occurs more readily and proceeds more nearly to completion if the carbon monoxide gas is maintained under pressures higher than atmospheric pressure. I have found also that black carbonaceous pigment is formed not only when pure carbon monoxide gas is caused to decompose, but also when carbon monoxide in admixture with inert gases is caused to decompose. I have found also that the admixture of hydrogen with the carbon monoxide gas has no deleterious effect and even increases the yield of black carbonaceous pigment from the gas.

As an example of the advantageous embodiment of my invention, I pass a mixture of carbon monoxide gas and nitrogen gas obtained by blowing air through a bed of incandescent coke in a gas producer, then a cooler, which reduces the temperature of the gas mixture to 750 degrees centigrade. I then pass this gas mixture through a compressor which compresses the gas to a pressure of 50 pounds per square inch. The gas is then passed under this pressure through a screen of cobalt metal wire contained in a reaction chamber maintained at a temperature of 750 degrees centigrade. The reaction products are then cooled and allowed to escape through a collection chamber, in which the finely divided black carbonaceous pigment is collected and recovered, while the waste gas is allowed to escape into the air.

It is understood that this example is given merely to describe one method of practicing my invention, and that I do not restrict myself to the specific apparatus, or the specific conditions described in this example.

Having thus described my invention, I claim as new and desire to secure by Letters Patent:

1. The process of manufacturing black carbonaceous pigment by the decomposition of carbon monoxide gas at temperatures above 300 degrees centigrade and below 800 degrees centigrade and in the presence of a catalyst consisting of a metal of the eighth group of the periodic table.

2. The process of manufacturing black carbonaceous pigment by the decomposition of carbon monoxide gas at temperatures above 300 degrees centigrade and below 800 degrees centigrade, in the presence of cobalt metal as a catalyst.

3. The process of manufacturing black carbonaceous pigment by the decomposition of carbon monoxide gas at temperatures above 300 degrees centigrade and below 800 degrees centigrade, and at pressures greater than atmospheric pressure.

4. The process of manufacturing black carbonaceous pigment by the decomposition of carbon monoxide gas at temperatures above 300 degrees centigrade and below 800 degrees centigrade, in the presence of a catalyst, and at pressures greater than atmospheric pressures.

5. The process of manufacturing black carbonaceous pigment by the decomposition of carbon monoxide gas at temperatures above 300 degrees centigrade and below 800 degrees centigrade, in the presence of a catalyst consisting of a metal of the eighth group of the periodic table, and at pressures greater than atmospheric pressure.

6. The process of manufacturing black carbonaceous pigment by the decomposition of carbon monoxide gas at temperatures above 300 degrees centigrade and below 800 degrees centigrade, in the presence of cobalt metal as a catalyst, and at pressures greater than atmospheric pressure.

7. The process of manufacturing black carbonaceous pigment by bringing a gaseous mixture containing carbon monoxide into contact with a catalyst at temperatures above 300 degrees centigrade and below 800 degrees centigrade.

8. The process of manufacturing black carbonaceous pigment by bringing a gaseous mixture containing carbon monoxide into contact with a metal of the eighth group of the periodic table, at temperatures above 300 degrees centigrade and below 800 degrees centigrade.

9. The process of manufacturing black carbonaceous pigment by bringing a gaseous mixture containing carbon monoxide into contact with cobalt metal, at temperatures above 300 degrees centigrade and below 800 degrees centigrade.

V. H. SCHNEE.

Witnessed by—
FRED H. RHODES.